United States Patent
Richards et al.

(10) Patent No.: US 10,946,627 B2
(45) Date of Patent: Mar. 16, 2021

(54) WEATHERABLE FIRST SURFACE OVER A TIE LAYER OVER A PULTRUDED SUBSTRATE

(71) Applicant: Arkema France, Colombes (FR)

(72) Inventors: Thomas H. Richards, New Britain, PA (US); Florence Mehlmann, Berwyn, PA (US); Laurent B. Cartier, Wayne, PA (US); Robert L. Kensicki, Downingtown, PA (US); Robert J. Barsotti, Newtown Square, PA (US); Charles C. Crabb, Royersford, PA (US); Adam N. Toft, Norristown, PA (US); Steven B. Lacock, Perkiomenville, PA (US)

(73) Assignee: Arkema France, Colombes (FR)

( * ) Notice: Subject to any disclaimer, the term of this patent is extended or adjusted under 35 U.S.C. 154(b) by 198 days.

(21) Appl. No.: 15/304,569

(22) PCT Filed: Apr. 8, 2015

(86) PCT No.: PCT/US2015/024871
§ 371 (c)(1),
(2) Date: Oct. 17, 2016

(87) PCT Pub. No.: WO2015/160585
PCT Pub. Date: Oct. 22, 2015

(65) Prior Publication Data
US 2017/0036428 A1 Feb. 9, 2017

Related U.S. Application Data

(60) Provisional application No. 61/980,750, filed on Apr. 17, 2014.

(51) Int. Cl.
*B32B 27/08* (2006.01)
*B32B 7/12* (2006.01)
(Continued)

(52) U.S. Cl.
CPC .......... *B32B 27/08* (2013.01); *B29C 35/0805* (2013.01); *B29C 35/0866* (2013.01);
(Continued)

(58) Field of Classification Search
CPC ............ C09D 127/00–24; H01B 3/302; H01L 33/302; B29C 35/0805; B29C 35/0866;
(Continued)

(56) References Cited

U.S. PATENT DOCUMENTS

| 4,938,823 A | 7/1990 | Balazek et al. |
| 6,197,412 B1 | 3/2001 | Jambois |

(Continued)

FOREIGN PATENT DOCUMENTS

WO   WO 2008/144171 A1   11/2008

*Primary Examiner* — Ramsey Zacharia
(74) *Attorney, Agent, or Firm* — Thomas F. Roland

(57) ABSTRACT

The invention relates to a multilayered pultruded structure having a weatherable cap layer over a pultruded substrate, adhered with an appropriate tie layer. The structure provides improved weatherability and surface quality for pultruded structures. The invention is especially useful to provide a weatherable pultruded polyurethane, with an acrylic or styrenic cap layer. The weatherable polyurethane (PU) pultrusion of the invention provides an increased modulus over polyester pultrusions, making the weatherable PU pultrusion useful in commercial applications, and applications requiring a higher transverse modulus.

9 Claims, 1 Drawing Sheet

(51) Int. Cl.

| | |
|---|---|
| *B32B 27/30* | (2006.01) |
| *B32B 27/40* | (2006.01) |
| *B32B 27/34* | (2006.01) |
| *B32B 27/36* | (2006.01) |
| *B29C 70/52* | (2006.01) |
| *B29C 35/08* | (2006.01) |
| *B29C 48/15* | (2019.01) |
| *B29C 48/21* | (2019.01) |
| *B29C 48/22* | (2019.01) |
| *B32B 27/20* | (2006.01) |
| *B29C 48/154* | (2019.01) |
| *B29C 48/00* | (2019.01) |
| *B29K 75/00* | (2006.01) |
| *B29K 105/00* | (2006.01) |
| *B29K 105/08* | (2006.01) |
| *B29K 233/04* | (2006.01) |
| *B29K 277/00* | (2006.01) |
| *B29L 9/00* | (2006.01) |
| *B29L 31/10* | (2006.01) |

(52) U.S. Cl.
CPC ............ *B29C 48/022* (2019.02); *B29C 48/15* (2019.02); *B29C 48/154* (2019.02); *B29C 48/21* (2019.02); *B29C 48/22* (2019.02); *B29C 70/52* (2013.01); *B32B 7/12* (2013.01); *B32B 27/20* (2013.01); *B32B 27/302* (2013.01); *B32B 27/308* (2013.01); *B32B 27/34* (2013.01); *B32B 27/36* (2013.01); *B32B 27/40* (2013.01); *B29C 2035/085* (2013.01); *B29C 2035/0877* (2013.01); *B29K 2075/00* (2013.01); *B29K 2105/0097* (2013.01); *B29K 2105/08* (2013.01); *B29K 2233/04* (2013.01); *B29K 2277/00* (2013.01); *B29K 2995/0087* (2013.01); *B29L 2009/00* (2013.01); *B29L 2031/10* (2013.01); *B32B 2250/03* (2013.01); *B32B 2250/24* (2013.01); *B32B 2255/10* (2013.01); *B32B 2255/26* (2013.01); *B32B 2262/101* (2013.01); *B32B 2270/00* (2013.01); *B32B 2307/558* (2013.01); *B32B 2307/712* (2013.01); *B32B 2307/728* (2013.01); *B32B 2419/00* (2013.01); *B32B 2605/00* (2013.01)

(58) Field of Classification Search
CPC ..... B29C 48/022; B29C 48/15; B29C 48/154; B29C 48/21; B29C 48/22; B29C 70/52; B29C 2035/085; B29C 2035/0877; B29K 2075/00; B29K 2105/00; B29K 2105/0097; B29K 2105/08; B29K 2233/04; B29K 2277/00; B29K 2995/0087; B29L 2009/00; B29L 2031/10; B32B 7/12; B32B 27/08; B32B 27/20; B32B 27/302; B32B 27/308; B32B 27/34; B32B 27/36; B32B 27/40; B32B 2250/03; B32B 2250/24; B32B 2255/10; B32B 2255/26; B32B 2262/101; B32B 2270/00; B32B 2307/558; B32B 2307/712; B32B 2307/728; B32B 2419/00; B32B 2605/00
USPC .................................... 428/421, 422
See application file for complete search history.

(56) References Cited

U.S. PATENT DOCUMENTS

| | | | |
|---|---|---|---|
| 2002/0121722 A1* | 9/2002 | Davies .................. | B29C 70/081 264/129 |
| 2004/0137252 A1* | 7/2004 | Bonnet .................. | B32B 27/08 428/500 |
| 2007/0044906 A1* | 3/2007 | Park ..................... | B29C 47/0016 156/272.2 |
| 2009/0081448 A1 | 3/2009 | Jambois et al. | |
| 2012/0318557 A1* | 12/2012 | Iwasaki ................ | C08K 5/0025 174/113 C |
| 2012/0328808 A1* | 12/2012 | Mehlmann ............. | B32B 27/06 428/35.7 |
| 2013/0052395 A1 | 2/2013 | Davis et al. | |
| 2013/0167502 A1* | 7/2013 | Wilson .................. | B29C 70/025 57/210 |
| 2014/0147644 A1 | 5/2014 | Crabb et al. | |
| 2015/0034156 A1 | 2/2015 | Kensicki et al. | |

* cited by examiner

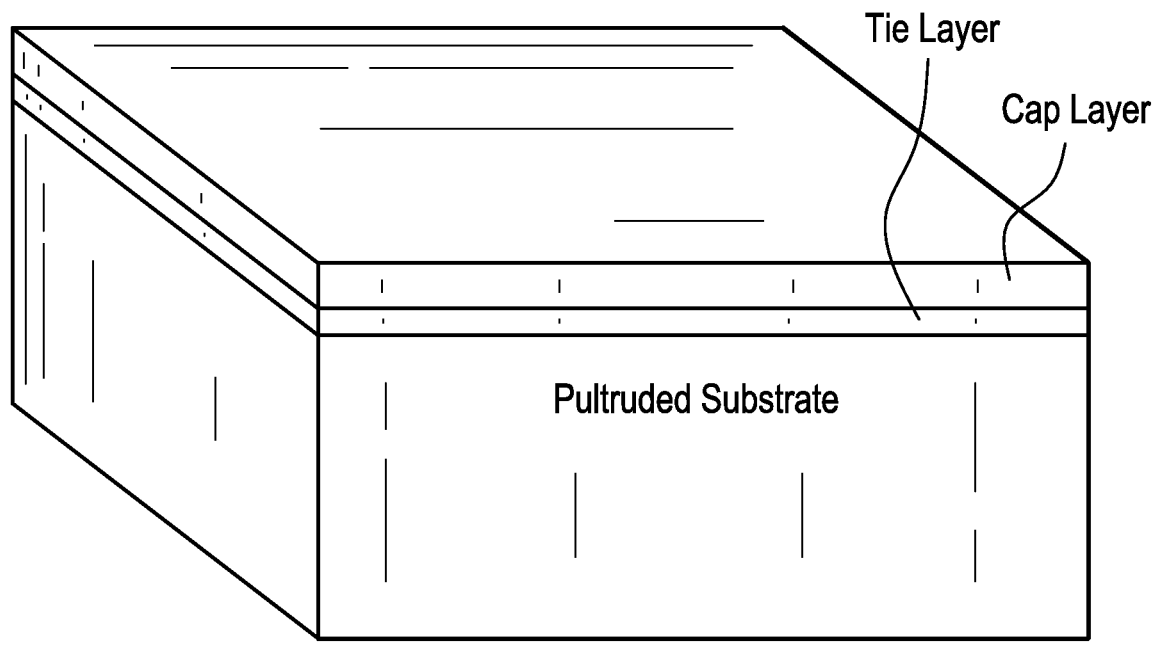

WEATHERABLE FIRST SURFACE OVER A TIE LAYER OVER A PULTRUDED SUBSTRATE

This application claims benefit, under U.S.C. § 119 or § 365 of PCT Application Number PCT/US2015/024871, filed Apr. 8, 2015, and U.S. Provisional Application No. 61/980,750, filed Apr. 17, 2014.

FIELD OF THE INVENTION

The invention relates to a multilayered pultruded structure having a weatherable cap layer over a pultruded substrate, adhered with an appropriate tie layer. The structure provides improved weatherability and surface quality for pultruded structures. The invention is especially useful to provide a weatherable pultruded polyurethane, with an acrylic or styrenic cap layer. The weatherable polyurethane (PU) pultrusion of the invention provides an increased modulus over polyester pultrusions, making the weatherable PU pultrusion useful in commercial applications, and applications requiring a higher transverse modulus.

BACKGROUND OF THE INVENTION

Pultruded substrates are used as replacements for wooden profiles in structures exposed to the weather, especially in residential windows and window frames, and doors and door frames. In pultrusion, a fiber reinforced substrate is formed by pulling a blend of fibers and a thermoset resin through a die. This fiber/thermoset blend is often called a fiberglass reinforced plastic (FRP). The resulting profile, is then coated with a durable thermoplastic polymer to improve the aesthetics and weathering properties.

U.S. Pat. No. 4,938,823 describes such a process, in which the fiber reinforced plastic (FRP) articles are formed by a pultrusion process, followed by the application of a thermoplastic external layer. The thermosetting resins mentioned are alkyds, diallyl phthalates, epoxies, melamines ureas, phenolics, polyesters and silicones. The thermoplastic, such as an acrylic, styrenic, or polyolefin is applied by a crosshead extrusion process directly onto the pultruded FRP, or optionally may be used with a primer adhesive coating or adhesion promoter.

U.S. Pat. No. 6,197,412 describes the direct crosshead extrusion of a weatherable cap layer, such as an acrylic, or fluoropolymer onto the pultruded substrate without using any adhesive. The pultruded substrate is flame, corona or plasma-treated to create radicals on the surface to improve adhesion. US 2009/0081448 describes the direct extrusion of two different cap layers onto a pultruded substrate, without the use of any adhesive.

Typical commercial pultrusion products are formed from a pultruded fiber-reinforced polyester resin substrate (with some alkyds, diallyl phthalates, epoxies, melamines/ureas, and phenolics resins also used) having an acrylic or styrenic cap directly co-extruded on top.

The problem with these materials is that weatherability, colorfastness and surface appearance could be improved.

Another problem with currently used polyester pultrusion, is that the modulus is not high enough for general use in the commercial building area. Polyurethane is known to have a higher modulus, and especially a higher transverse modulus than polyesters. However, thermoplastic capping materials do not adhere well to polyurethane-based pultrusion structures. Polyurethane resins are not described in the cited prior art.

Surprisingly, it has now been found that tie layers that can be used to not only provide improved weatherability and appearance for polyester and other commonly used capped pultrusion structures, but tie layers have also been found to provide adhesion between a polyurethane-based pultrusion and a capping layer.

With the higher modulus of the polyurethane-based, capped pultrusion structures, they could be used as replacements for coated aluminum and other metallic structural materials in commercial applications. Some of the possible uses would include window profiles, playground equipment, telephone poles and light poles, and seawater barriers. Based on the higher modulus, and high weatherability of a capped. Polyurethane pultrusion, one of skill in the art can imagine other uses for these lighter weight, weatherable replacements for coated metal structures.

SUMMARY OF THE INVENTION

The invention relates to a weatherable pultruded structure comprising, in order from inside to the outside:
 a) a pultruded structure comprising a fiber-reinforced thermoset resin;
 b) one or more tie layers, wherein at least one tie layer is selected from the group consisting of 1) an extrudable thermoplastic tie layer that is coextrudable with at least one of the pultruded structure a) or thermoplastic cap layer c), and 2) a radiation curable coating; and
 c) one or more thermoplastic cap layers.

The invention further relates to articles formed from this pultruded structure.

BRIEF DESCRIPTION OF THE DRAWINGS

FIG. 1 depicts the weatherable pultruded structure of the invention, in which the fiber-reinforced thermoset pultruded structure is covered by the tie layer of the invention, and the tie layer is covered by a cap layer.

DETAILED DESCRIPTION OF THE INVENTION

As used herein copolymer refers to any polymer having two or more different monomer units, and would include terpolymers and those having more than three different monomer units.

Molecular weights are given as weight average molecular weights, as measured by GPC.

Percentages, are given as weight percents, unless otherwise noted.

The references cited in this application are incorporated herein by reference.

The invention relates to a multi-layer structure having a pultruded substrate, a tie layer(s) and a weatherable outer layer. The invention further relates to a process for adhering a protective thermoplastic capstock to a pultruded substrate through the use of one or more tie-layers.

Pultruded Substrate

The pultruded substrate is a fiber-reinforced thermoset resin, produced by pulling a blend of fibers and the liquid resin through a die—as known in the art. The thermoset resin impregnates and coats the fibers, to produce a strong composite material once cured.

Useful fibers include those known in the art, including but are not limited to both natural and synthetic, fibers, fabrics, and mats, such as glass fibers, carbon fibers, graphite fibers, carbon nanotubes, and natural fibers such as hemp, bamboo or flax. Glass fibers, treated or untreated, are a preferred fiber.

Useful thermoset resins include, but are not limited to, alkyds, diallyl phthalates, epoxies, melamines and ureas, phenolics, polyurethanes and polyesters, maleimides, bismaleimdies, acrylics. Particularly preferred thermoset resins are polyesters and polyurethane. Due to its higher modulus, and cost, polyurethane is an especially preferred resin for use in the present invention.

In addition to the fibers and resin, other additives can be added to the pultruded structure composition, including but not limited to low profile additives (acrylics, poly vinyl acetate), acrylic beads, fillers, low molecular weight acrylic process aids—such as low molecular weight (less than 100,000, preferably less than 75,000 and more preferably less than 60,000 molecular weight), and low viscosity or low Tg acrylic resins (Tg<50° C.). Polymers, such as polyamides, block copolymers or other thermoplastics including acrylonitrile-butadiene-styrene (ABS), polyvinyl chloride (PVC0, high impact polystyrene (HIPS), acrylonitrile-styrene-acrylate (ASA), and polylactic acid (PLA), can be added to the pultruded substrate to allow domains/chemical functionalities to facilitate chemical adhesion or increase surface roughness to facilitate mechanical adhesion.

The surface of the pultruded structure may be altered physically (by the addition of polymer or glass beads, or roughening) or chemically (corona, flame or plasma treatment). The chemistry of the thermoset resin itself can be manipulated to improve adhesion, for example, by adjusting the ratio of the isocyanate and polyol in a polyurethane pultruded structure to provide more polyol ends—which could react with a polyamide tie layer; or by adding reactive groups into the thermoset polymer.

Further, a resin-rich skin could be produced by increasing the resin to fiber ratio in the outer layer of the pultruded structure, and thus improve adhesion.

Tie Layer

The invention involves the use of one or more tie layers or adhesion layers between the pultruded substrate and the cap layer(s) for the purpose of adhering the substrate and cap layer together. The tie layer or layers will be from 0.01 to 0.3 mm, and preferably from 0.02 to 0.15 mm in thickness. A tie layer is defined as a layer between two other layers (top and bottom) that provides for adhesion of one layer to the other layer. If the top layer already has adequate adhesion (90° T peel testing based on ASTM D1876 with an average load of >1 lbf/in) to the bottom layer than any intermediate layer would not be considered a tie layer.

Two different types of tie layers are envisioned in the present invention. The first is an extrudable tie layer or layers, that would be applied directly to the pultruded substrate. The tie layers are selected for affinity to the one or both substrate and cap layer. In the case of multiple tie layers, the first is selected for its affinity to the pultruded substrate (and the second tie layer), while the second tie layer is selected for its affinity to the cap layer (and the first tie layer). Useful extrudable tie layers include, but are not limited to, thermoplastics including polyamides, copolyamides, block copolymers of polyamide and polyester; acrylic, stryrenic or butadiene-based block copolymers, functionalized olefins, functionalized acrylics, polylactic acid (PLA) and ABS.

A particularly preferred tie layer is a copolyamide blend made up of two or more different and varying polyamide repeat units (6; 6,6; 12; 11; etc). While not being bound by any particular theory, it is believed that a random copolyamide blend retards crystallization, while providing good adhesion to a variety of materials—including polyurethane, acrylics and styrenics. One specific useful extrudable polyamide adhesive blend is sold under the tradename of PLATAMID® by Arkema Inc. In one preferred embodiment, the melting point of the copolyamide or copolyamide blend is <150° C.

In order to further improve adhesion, the viscosities of the extruded layers should be relatively the same, with the complex viscosity delta (as measured by rotational viscosity at 10 Hz) of the cap and tie layer being preferably less than 1000 Pa·s and more preferably less than 300 Pa·s. The viscosity of each extruded layer can be adjusted by controlling the extrusion barrel temperature. In one preferred embodiment, the extrusion barrel temperature of the tie layer is at least 10° C., and most preferably at least 30° C. lower than the extrusion barrel temperature of the capstock layer. The viscosities of the extruded layer may also be adjusted by the formulation of the extrudable tie layer. Increasing the MW of the polymeric tie layer, incorporation of high mw polymer, addition of cross-linked organic polymer such as core shell impact modifiers or addition of inorganic filler are some ways to increase the viscosity of the extruded layer but my no means constitute an exhaustive list.

The extrudable adhesive layer is in the range of 0.05 to 0.3 mm, preferably from 0.075 to 0.15 mm in thickness.

A second useful tie layer is a coating that can be activated by radiation through free radical polymerization. For example, a UV/EB-curable acrylic composition, comprising acrylic oligomer and monomer, such as available from Sartomer, can be directly applied by roll coating, curtain coating, or spraying directly onto the pultruded structure followed by curing via a UV lamp source, with the cap layer extruded immediately after the lamp. Since the cap layer will be resistant to UV radiation, it is not possible to activate the tie layer through the cap layer following extrusion of the cap layer.

An alternative would be to use a radiation curable adhesive that can be activated through a UV-opaque material, in a system similar to that described in WO 13/123,107. In this case, the adhesive tie-layer could be sprayed onto the pultruded substrate, followed by extrusion of the thermoplastic cap layer, followed by a cure of the tie layer by LED or e-beam radiation. The adhesive composition includes a reactive oligomers, functional monomers, and photoinitiator (for use with photon radiation sources), In a preferred embodiment, the radiation curable adhesive composition contains one or more aliphatic urethane (meth) acrylates based on polyester and polycarbonate polyols, in combination with mono and multifunctional (meth)acrylate monomers. Alternately the oligomer can include mono or multifunctional (meth)acrylate oligomers having polyesters and/or epoxy backbones, or aromatic oligomers alone or in combination with other oligomers.

Non-reactive oligomers or polymers could also be used in conjunction with (meth)acrylate functional monomers and/or oligomers. The viscosity of the liquid adhesive composition can be adjusted by the choice of, and concentration of oligomers to monomers in the composition.

Monomers useful in the adhesive tie layer include, but are not limited to: (meth)acrylate esters of alcohols such as iso-octanol; n-octanol; 2-ethylhexanol, iso-decanol; n-decanol; lauryl alcohol; tridecyl alcohol; tetradecyl alcohol; cetyl alcohol; stearyl alcohol; behenyl alcohol; cyclohexyl alcohol; 3,3,5-trimethyl cyclohexyl alcohol; cyclic trimethylolpropane formal; 2-phenoxy ethanol; nonyl phenol, isobornol; and (meth)acrylate esters of diols and polyols such as ethylene glycol; propylene glycol; 1,3 propane diol; 1,3 butane diol; 1,4 butane diol; 1,6 hexanediol; 3-methyl-1,5-pentanediol; 1,9-nonanediol; 1,10-decanediol, 1,12-dodecanediol; 1,4-cyclohexanedimethanol; tricyclodecanedimethanol; neopentyl glycol; trimethylol propane; glycerol; tris (hydroxyethyl)isocyanurate; pentaerythritol; di-trimethylolpropane; di-pentaerythritol; and alkoxylated or caprolacatone modified derivatives of such alcohols, diols and polyols; dipropylene glycol; tripropylene glycol and higher polypropylene glycols; diethylene glycol; triethylene glycol; tetraethylene glycol and higher polyethylene glycols; mixed ethylene/propylene glycols. Dual functional monomers such as hydroxyl monomers such as hydroxyethyl acrylate or hydroxyl caprolactone acrylates may also be useful for adjustion system adhesion properties. Beta-carboxyethyl acrylate, a carboxyl functional acrylate monomer, is also useful in certain systems.

Aliphatic urethane acrylate oligomers useful in the invention include, but are not limited to those prepared from aliphatic isocyanates such as; hydrogenated methylene diphenyldiisocyante; isophorone diisocyanate, hexamethylene diisocyanate, trimethyl hexamethylene diisocyanate and allophanates and biurets of such isocyanates in combination with various polydiols or polyols such as; polyester polyols derived from di or poly-hydroxy compounds and di or poly-carboxylic acid functional compounds, polyether diols derived from polyethylene glycol, polypropylene glycol, poly-1,3-propanediol, polybutanediol or mixtures of these; polycarbonate diols prepared from various diols such as 1.3-propanediol, 1,3-butanediol,1,4-butanediol, 1,5-pentanediol, neopentyl glycol, methy pentanediol, 1,6-hexanediol, 1,4-cyclohexanediol, 2-ethyl hexyl diol and similar alkyl diols; end capped at both ends or one end with a hydroxyl functional (meth)acrylate capping agent such as hydroxyl ethyl (meth)acrylate, hydroxyl propyl (meth)acrylate, polycaprolactone(meth)acrylate.

Aliphatic urethane acrylates based off of polyester and polycarbonate polyols are preferred.

The aliphatic urethane acrylates generally have a molecular weight of from 500 to 20,000 daltons; more preferably between 1,000 and 10,000 daltons and most preferably from 1,000 to 5,000 daltons. If the MW of the oligomer is too great the crosslink density of the system is very low creating an adhesive that has a low tensile strength. Having too low of a tensile strength causes problems when testing peel strength as the adhesive may fail prematurely.

The content of aliphatic urethane oligomer in the oligomer/monomer blend should be 5% to 80% by weight; more preferably 10% to 60% by weight and most preferably from 20% to 50% by weight.

The radiation cured adhesive layer is in the range of 0.01 to 0.04 mm, preferably from 0.02 to 0.03 mm in thickness.

The photoinitiator is one that absorbs photons to produce free radicals that will initiate a polymerization reaction. Useful photoinitiators of the invention include, but are not limited to bis acyl phosphine oxides (BAPO), and trimethyl-diphenyl-phosphineoxides (TPO), 2-hydroxy-2-methyl-1-phenyl-1-propanone and other α-hydroxy ketones, benzophenone and benzophenone derivates, and blends thereof.

The photoinitiator is present in the adhesive tie composition at 0.2 to 6.0 weight percent based on the total of the adhesive composition, preferably from 0.5 to 5.0 percent by weight. In the alternative, if electron beam radiation is used for the curing, no photoinitiator is needed.

An aqueous based emulsion can also be considered as a tie layer, preferably an acrylic based emulsion.

The tie layer(s) of the invention may be optimized by adding reactive chemical functionalities as additives or comonomers (acid, anhydide, alcohol, glycidyl, piperazine, urea, ether, ester) or adding acrylic beads, fillers, low molecular weight acrylic process aids, low viscosity or low Tg acrylic resins, polyamides, block copolymers or other thermoplastics (ABS, PVC, HIPS, ASA, PLA) to improve adhesion either via chemical or mechanical (surface roughness) mechanisms. Reactive groups can also be incorporated into the layer in contact with the polyurethane (PU) so that they react with the unreacted groups (isocyanates or polyols) on the PU, promoting adhesion. In this case, preferably, the cross head die should be kept as close to the pultrusion die as possible to maximize the number of available reactive groups available when the coextrusion takes place.

Incorporation of 0 to 60% of high molecular weight polymers (Mw>100,000), cross-linked polymeric systems (such as core shell impact modifiers), inorganic fillers or other rheological additives may alter the viscosity of the tie layer, potentially leading to improved adhesion.

Incorporation of 0 to 60% of core shell impact modifiers (preferably acrylic) may also improve the toughness and ductility of the tie layer, potentially critical for any application where residual stress in the fabricated part could lead to cracking during assembly/installation or due to exposure to the elements in outdoor applications.

In certain cases where exposure to water/water vapor at elevated temperatures is critical for the application, it may be desirable to decrease the hydrophilicity of the tie layer, to prevent water absorption. In these cases, it may be advantageous to alloy a hydrophilic tie layer (such as a copolyamide) with 0 to 60% of a more hydrophobic materials such as olefins, styrenics, acrylics or core shell polymers.

In certain cases where exposure to high temperatures is required, it may be advantageous to alloy the tie layer with polymers having higher thermal properties—via a higher melting point or higher glass transition point. In other cases, where shrinkage of the tie layer is problematic, it may be advantageous to alter the percent crystallinity of a semi-crystalline polymeric tie layer, using alloys with 0 to 60% of either miscible or immiscible polymers or 0 to 60% inorganic or organic sub-micron particles that may either serve as either nucleating agents or crystallinity suppressors as needed for the application.

Cap Layer

A cap layer or layers is applied to tie layer on the pultruded substrate. The cap layer may be directly applied in-line by a spray, aqueous or solvent coating, or by an extrusion process—with an extrusion process being preferred. The cap layer, and tie layer, could also be applied in one or more separate steps, such as by a coating, compression molding, roto-molding, lamination, or overmolding (injection molding) processes.

The cap layer(s) have a thickness of between 0.0025 and 1 mm, preferably between 0.005 and 0.5 mm.

Useful cap layer polymers include, but are not limited to styrenic-based polymers, acrylic-based polymers, polyesters, polycarbonate and thermoplastic polyurethane (TPU). Preferred cap layer polymers are styrenic and/or acrylic-based. The acrylic-based layer comprises either an acrylic polymer, or a vinyl cyanide-containing compound, for example an acrylonitrile-butadiene-styrene (ABS) copolymer, an acrylonitrile-styrene-acrylate (ASA) copolymer, or styrene acrylonitrile (SAN) copolymer. "Acrylic polymer" as used herein is meant to include polymers, copolymers and terpolymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methacrylic acid and acrylic acid can be useful for the monomer mixture. Most preferably the acrylic polymer is a copolymer having 70-99.5 weight percent of methyl methacrylate units and from 0.5 to 30 weight percent of one or more $C_{1-8}$ straight or branched alkyl acrylate units.

Styrenic-based polymers include, but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-butadiene-styrene (MBS) copolymers, styrene-butadiene-styrene block (SBS) copolymers and their partially or fully hydrogenenated derivatives, styrene-isoprene-styrene (SIS) block copolymers and their partially or fully hydrogenenated derivatives, and styrene-methyl methacrylate copolymers (S/MMA). A preferred styrenic polymer is ASA. The styrenic polymers of the invention can be manufactured by means known in the art, including emulsion polymerization, solution polymerization, and suspension polymerization. Styrenic copolymers of the invention have a styrene content of at least 10 percent by weight, preferably at least 25 percent by weight.

In one embodiment, the cap layer polymer has a weight average molecular weight of between 50,000 and 500,000 g/mol, and preferably from 75,000 and 150,000 g/mol, as measured by gel permeation chromatography (GPC). The molecular weight distribution of the acrylic polymer is monomodal or multimodal and the polydispersity index is higher than 1.5.

In one embodiment, the acrylic-based layer is a blend of an acrylic polymer and 5 to 80 wt %, preferably 10 to 40 wt %, of a polyvinylidene fluoride polymer or copolymer thereof.

In one embodiment, a thin (less than 0.5 mm and preferably less than 0.25 mm) layer of fluoropolymer, and in particular a homopoloymer or copolymer of polyvinylidene fluoride (PVDF)—preferably with greater than 60 weight percent, and more preferably grater than 75 weight percent of vinylidene fluoride monomer units, is placed on the outermost surface of the pultruded structure. The PVDF layer can be functionalized (such as a maleic anhydride graft polymer) for better adhesion, or can be adhered to a layer that is a blend of PVDF and an acrylic polymer.

In another embodiment, the cap layer(s) of the invention may be optimized for adhesion by adding reactive chemical functionalities as additives or comnomers or adding acrylic beads, fillers, low molecular weight acrylic process aids, low viscosity or low Tg acrylic resins, polyamides, block copolymers or other thermoplastics (ABS, PVC, HIPS, ASA, PLA).

Other typical additives may also be added to one or more of the tie or cap layers, including but not limited to impact modifiers, fillers or fibers, or other additives of the type used in the polymer art. Examples of impact modifiers include, but are not limited to, core-shell particles—with either a hard or soft core, and block or graft copolymers. Examples of useful additives include, for example, UV light inhibitors or stabilizers, lubricant agents, heat stabilizers, flame retardants, synergists, pigments and other coloring agents. Examples of fillers employed in a typical compounded polymer blend according to the present invention include talc, calcium carbonate, mica, matting agents, wollastonite, dolomite, glass fibers, boron fibers, carbon fibers, carbon blacks, pigments such as titanium dioxide, or mixtures thereof. In one embodiment, the acrylic polymer is blended with a polyvinylidene fluoride polymer or copolymer, or with an aliphatic polyester—such as polylactic acid. Examples of matting agents include, but are not limited to, cross-linked polymer particles of various geometries, The amount of filler and additives included in the polymer compositions of each layer may vary from about 0.01% to about 70% of the combined weight of polymer, additives and filler. Generally amounts from about 5% to about 45%, from about 10% to about 40%, are included.

Pigmented pultruded structures are especially useful. The pigment in such a structure may be placed in the tie layer, and/or in one or more cap layers. In a preferred embodiment, the outermost layer contains very few, if any additives—as many additives can decrease the weatherability. A preferred embodiment is to place pigment and other additives in a first cap layer, covered by a clear outermost weatherable layer.

Uses

The weatherable, capped, pultruded substrate of the invention is useful as a replacement for wood and metal structures and parts. Typical uses include: window profiles (residential and commercial), windows, doors, door profiles, fencing, decking, railings, skylight framings, commercial curtainwall used in skyscrapers. Because of its weatherability, increased modulus, and lighter weight, capped pultruded polyurethane could replace coated metal, and especially coated aluminum in playground equipment, ladders, commercial building materials, truck and car parts, recreational vehicle parts, public transport vehicle parts, agricultural vehicle parts, sea walls, utility poles, lamp posts, ladders,

EXAMPLES

1. A 6 mil impact modified acrylic (SolarKote® H300 from Arkema Inc.) was extruded at a melt temperature of 450-475° F. over a 12 mil copolyamide blend extrudable adhesive at a low melt temperature (270° F.-350° F.). The coextruded sheet was compression molded over a pultruded polyurethane substrate forming the multi-layer weatherable structure. In order to test adhesion, the tie layer was compression molded separately to either the pultruded polyurethane substrate or the SolarKote® H300 layer. 90° T peel testing based on ASTM D1876 was performed to quantify adhesion. An average load of greater than 1 lbf/in was achieved with either layer. Conversely if SolarKote® H300 layer is bonded directly to the pultruded polyurethane almost no adhesion is seen.

2. An alloy of two copolyamide materials with different melting point was compounded on a Leistritz 27 mm twin screw extruder. (2a) An alloy of the lower melting point copolyamide material with an acrylic core shell impact modifier was also compounded on a Leistritz 27 mm twin screw extruder. (2b) A 375 μm-500 μm thick film of both alloys and of the lower melting point copolyamide (2c) were made by compression molding. These films were then compression molded over a pultruded polyurethane substrate to test adhesion of the tie layer to the substrate. 90° T peel testing based on ASTM D1876 was performed to quantify adhesion and average load of greater than 1 lbf/in was achieved with all three samples. To test the stability of the material, samples of the tie layer films were immersed in boiling water for 1 mm. Sample 2c showed significant shrinkage and deformation, while samples 2a and 2b only showed minor buckling. This demonstrates the ability to alter the hydrophilicity, thermal properties, toughness and shrinkage characteristics of the tie layer via alloying or incorporation of additives.

3. A thin layer of a UV-curable acrylic adhesive was applied to a pultruded polyurethane substrate using a wire bar to control adhesive thickness. The pultruded compound was then placed onto a belt which passed under an Hg arc lamp. The cured substrate was then placed inside a mold used for injection molding on a 100 T Engel. The mold was specifically designed to hold the size of the polyurethane substrate with a small space where an acrylic cap could be applied. A SolarKote® capstock resin was injection molded over the polyurethane substrate to form the multilayer weatherable structure.

What is claimed is:

1. A weatherable, capped, pultruded structure comprising, in order from inside to the outside:
    a) a pultruded structure comprising a fiber-reinforced polyurethane thermoset resin;
    b) one or more tie layers, wherein at least one tie layer is an extrudable thermoplastic tie layer that is coextrudable with at least one of the pultruded a) or thermoplastic cap layer c), wherein said thermoplastic tie layer is selected from the group consisting of polyamides, copolyamides, copolyamide blends, block copolymers of polyamide and polyester; acrylic, stryrenic or butadiene-based block copolymers, functionalized olefins, functionalized acrylics, and acrylonitrile-butadiene-styrene (ABS) copolymer; and
    c) one or more thermoplastic cap layers, wherein said cap layer consists of a thermoplastic selected from the group consisting of acrylics, styrenics and thermoplastic polyurethane.

2. A weatherable, capped, pultruded structure of claim 1, wherein said tie layer contains a functionality selected from the group consisting of acid, anhydride, alcohol, glycidyl, piperazine, urea, ether, or ester.

3. A weatherable, capped, pultruded structure of claim 1, wherein said extrudable thermoplastic tie layer comprises acrylic core shell impact modifiers.

4. A weatherable, capped, pultruded structure of claim 1, wherein said extrudable tie layer comprises a thermoplastic polymer adhesive, selected from the group consisting of polyamides, copolyamides, block copolymers of polyamide and polyester; acrylic, stryrenic or butadiene-based block copolymers, functionalized olefins, functionalized acrylics, and ABS.

5. An article comprising the weatherable pultruded structure of claim 1.

6. The article of claim 5, wherein said article is selected from the group consisting of window profiles, doors, door profiles, playground equipment, utility poles, and sea walls.

7. A process for forming the weatherable pultruded structure of claim 1 comprising the steps of:
    a) forming a fiber-reinforced structure using a pultrusion process,
    b) adhering one or more tie layers to the pultruded structure,
    c) adhering one or more cap layers to said tie layer/pultruded structure.

8. The process of claim 7, wherein said tie layer(s) and cap layers are coextruded onto said substrate.

9. The weatherable pultruded structure of claim 1, wherein said fiber-reinforced thermoset resin comprises, one or more fibers selected from the group consisting of glass fibers, carbon fibers, graphite fibers, carbon nanotubes, hemp, bamboo and flax.

* * * * *